July 12, 1932. R. S. BURDETTE 1,866,797
SOLID TIRE
Filed Dec. 10, 1927

Inventor
Richard S. Burdette.

By

Attorney

Patented July 12, 1932

1,866,797

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

SOLID TIRE

Application filed December 10, 1927. Serial No. 239,172.

This invention relates to vehicle tires and it has particular relation to a cushion tire which is especially adapted to withstand the effects of heat generated outside the tire.

One object of the invention is to provide a tire which is capable of withstanding a high degree of heat to which the external surface thereof is subjected.

Another object of the invention is to provide a tire which is capable of withstanding the effects of heat from an external source and yet maintains its normal strength.

Tires of the type heretofore known, when subjected to a high degree of heat from an external source, prematurely deteriorated by deformation, loss of resiliency, etc. When ordinary tires were used in foundries, steel mills and like places they rapidly deteriorated and frequent replacements were required. The tires may be subjected to heat either through radiation from a heat source, such as a furnace, by convection in warm surroundings, or by actual contact with warm surfaces, such as floors near furnaces or the like. Under any of these conditions the heat first affects the outer or exposed surface of the tire.

In order to prevent heat from the sources referred to, from materially affecting the tire, I provide on the outer surface thereof a material that is substantially a non-conductor of heat or a material having a relatively low coefficient of heat transmission. This prevents the heat from reaching the inner parts of the tire and as a result the life of the tire is greatly prolonged. It is preferable also to provide reinforcing means inwardly of the heat resisting material, but it is to be understood that the invention is applicable when such reinforcement is omitted.

Figure 1:
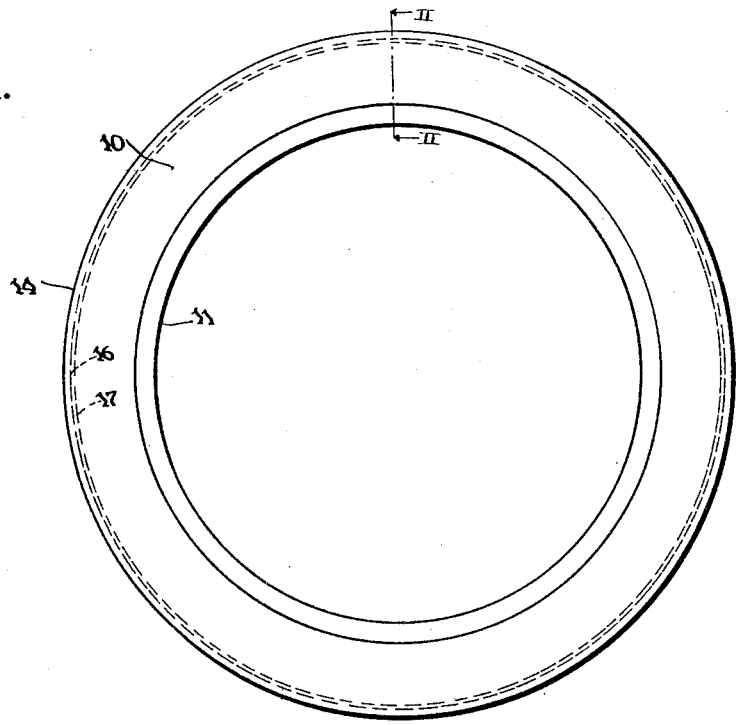
Figure 2:
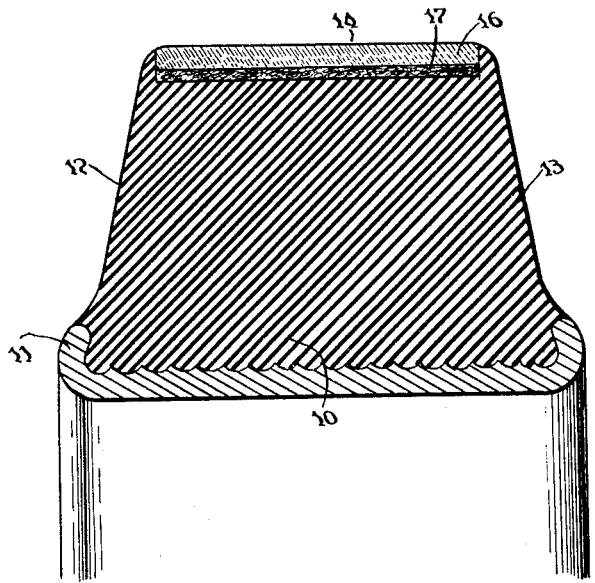

For a better understanding of the invention, reference may now be had to the accompanying drawing, forming a part of this specification, in which:

Fig. 1 is an elevational view of a tire constructed according to the invention; and Fig. 2 is a cross-sectional view, on a larger scale, taken substantially along the line II—II of Fig. 1.

In practicing the invention, I provide a solid or cushion tire body portion 10 composed of rubber compound that is secured to a base band 11. The tire is of conventional shape having side surfaces 12 and 13 and a peripheral portion 14. The surface of the portion 14 is preferably plain, but of course a tread of any design may be provided thereon.

In the preferred form of the invention, one or more layers of rubberized asbestos fabric 16 is applied to the outer surface of the body portion 10. The fabric may form the outer surface of the tire or a thin layer of rubber may be provided on the exterior surface thereof. Since the asbestos fabric, to a substantial degree, is a non-conductor of heat, it serves to protect the main rubber body portion 10 from the deteriorating effects thereof. Asbestos fabric however has a low tensile strength as compared with ordinary cross-woven or straight woven cotton fabric, and for this reason it has been found desirable to employ rubberized cotton fabric 17 inwardly of, and adjacent the asbestos fabric, to reinforce the latter. Owing to the superior strength of the cotton fabric it withstands most of the stresses which would otherwise be transmitted to the asbestos. The asbestos fabric in turn protects the cotton fabric from being damaged by the heat.

It is to be understood that one or more layers of each fabric may be employed, or the two types of fabric may be spaced relative to each other and relative to the outer surface of the tire. Also, the fabrics need not necessarily be limited to the outer surface 14 of the tire, but if desired may be extended to protect the entire exposed surface thereof.

From the foregoing description it will be apparent that tires constructed according to this invention are particularly adapted to be utilized in plants, such as steel mills, where the tires are operated over hot surfaces or are operated under such conditions that extreme heat results because of convection or radiation. Because of their construction, the tires are practically unaffected by the heat conditions recited and their life accordingly is materially prolonged.

Although I have illustrated but one form which the invention may assume and have described but a single application thereof, it will be apparent to those skilled in the art that it is not so limited but that various modifications may be made therein without departing from the spirit of the invention or from the scope of the appended claims.

What I claim is:

1. In a solid rubber tire, a layer of asbestos fabric disposed on the outer surface of the time in circumferential plies for protecting the tire from the effects of heat and constituting its tread, and a layer of relatively strong fabric on the inner surface of the first fabric for reinforcing the latter, said materials being vulcanized to the tire.

2. A tire for a vehicle wheel comprising a body portion secured to the periphery of the wheel and a layer of material substantially unaffected by heat and having a relatively low coefficient of heat transmission disposed on the outer surface of the body portion in circumferential plies and constituting its tread, said material being vulcanized to the remainder of the body portion.

3. In a solid rubber tire a layer of fibrous mineral fabric on the outer surface of the tire and constituting its tread, said layer extending in circumferential plies parallel to the axis of the tire, said fabric being substantially unaffected by heat, and a layer of fibrous vegetable fabric adjacent the inside of the first layer for reinforcing the latter, said layers being vulcanized to the tire.

In witness whereof, I have hereunto signed my name.

Signed at Akron, in the county of Summit, and State of Ohio, this 9th day of December, 1927.

RICHARD S. BURDETTE.